Figure 1:
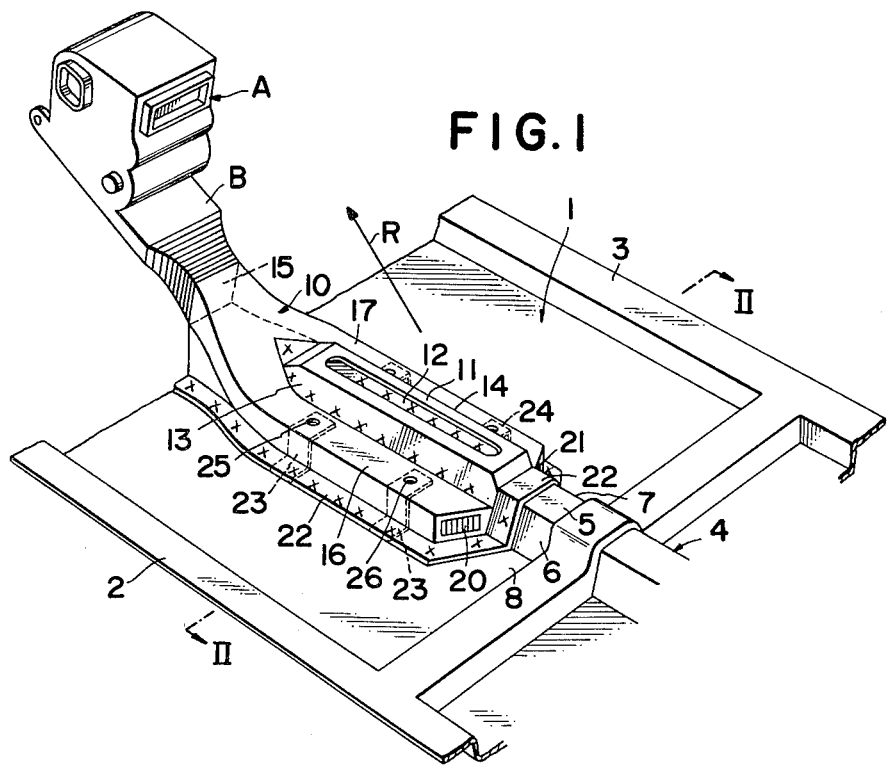

United States Patent [19]
Yamada

[11] 3,919,926
[45] Nov. 18, 1975

[54] FLOOR STRUCTURE OF CAR BODY

[75] Inventor: Kohsaku Yamada, Toyota, Japan

[73] Assignee: Toyota Jidosha Kogyo Kabushiki Kaisha, Japan

[22] Filed: Apr. 29, 1974

[21] Appl. No.: 465,076

[30] Foreign Application Priority Data
May 16, 1973 Japan.................. 48-57457

[52] U.S. Cl.................. 98/2.03; 98/2.05
[51] Int. Cl.².................. A47C 7/74; B60H 1/00
[58] Field of Search ............. 62/244; 98/2.03, 2.05, 98/2.06, 2.07

[56] References Cited
UNITED STATES PATENTS

| 2,256,724 | 9/1941 | Onishi | 98/2.03 |
| 2,347,141 | 4/1944 | Werdehoff | 98/2.03 |
| 2,696,774 | 12/1954 | Bayley | 98/2.06 |
| 2,882,809 | 4/1959 | Nelson | 98/2.05 |
| 2,978,972 | 4/1961 | Hake | 98/2.03 |

*Primary Examiner*—John J. Camby
*Assistant Examiner*—Henry C. Yuen
*Attorney, Agent, or Firm*—Stevens, Davis, Miller & Mosher

[57] ABSTRACT

A floor structure of a car body, comprising a floor plate-reinforcing member which is fixed onto a floor plate and a tunnel portion and extends over a predetermined length. Even when an impact load is transmitted to a seat track through a seat belt, it is distributed over various parts, so that the deformation of the floor plate, etc. otherwise occurring is prevented.

7 Claims, 2 Drawing Figures

U.S. Patent Nov. 18, 1975 3,919,926

FLOOR STRUCTURE OF CAR BODY

The present invention relates to the floor structure of a car body.

In a prior-art floor structure of a car body, over a tunnel portion formed on a floor plate in a car room, a pedestal for mounting a seat track as is bent and formed so as to conform to the shape of the longitudinal section of the tunnel portion is formed by the use of a separate steel plate member. The pedestal is fixed to the floor plate by welding its leg piece portions to the floor plate or by securing them through suitable means such as clamp members. In addition, an air duct from an air conditioner is separately fabricated and secured.

The pedestal therefore becomes structurally simple. On the other hand, however, the prior art has some serious problems. In case of a car in which an anchor for seat belt is secured to a seat frame, when a high load acts on the seat track through the seat belt, the leg piece portions of the pedestal cannot withstand the load. The floor is accordingly lifted, so that the seat is brought down frontwards in large degree. As the result, the survival space for occupants, namely, the interspace between a seat back and a steering wheel, instrument panel, etc. is lost, and severe damages are inflicted on the occupants. Further, the number of components is large, and the number of the stages of work accordingly increases. Besides, the residence space becomes narrow.

An object of the present invention is to provide a floor structure which has strength and rigidity enough to withstand a high load as a securing member for a seat track, whose reinforcement portion also functions as air ducts towards the rear seat, which prevents the deformation of a floor plate and the forward falling of the front seat ascribable to a high impact load, and which can be fabricated in a simple construction and at low cost.

Figure 2:
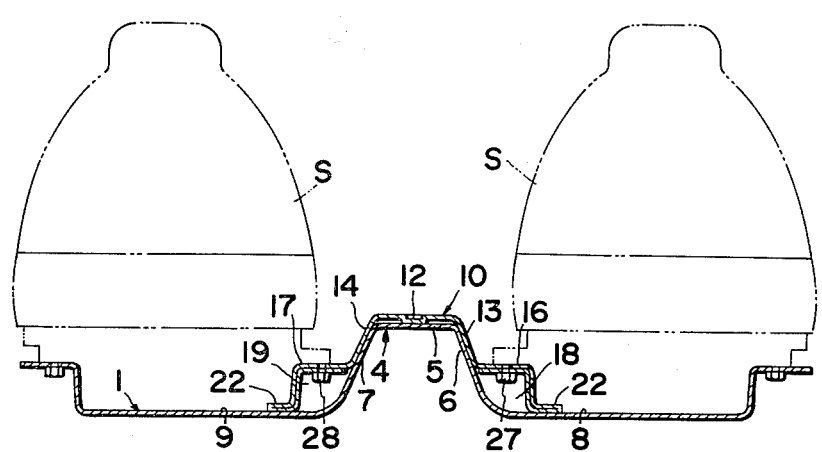

This and other objects of the invention will be seen by reference to the description, taken in connection with the accompanying drawings, in which:

FIG. 1 is a perspective view, partially broken away, showing the floor structure of the present invention; and FIG. 2 is a cross-sectional view taken along a line II—II in FIG. 1.

At both side parts of a floor plate 1 inside the passenger compartment of a car, mounting portions 2 and 3 of protrusive steps for integrally supporting a seat track on the outer sides of a driver's seat and an assistant driver's seat constituting the front seat are respectively bent and formed into the same shape.

On the center line of the floor plate 1, a tunnel portion 4 curved and molded extends towards the interior of the passenger compartment in the lengthwise direction of the floor plate 1. In the tunnel portion 4, a propeller shaft is arranged which is provided for transmitting the driving force of an engine to the rear wheels.

On the upper end surface 5 and both side edges 6 and 7 of the tunnel portion 4 and on both sides 8 and 9 with respect to the tunnel portion 4, a floor plate-reinforcing member 10 is integrally secured and disposed by suitable means. It is curved and formed by the use of a steel plate material separate from the floor plate 1.

The floor plate-reinforcing member 10 is molded so as to define spaces of a closed section, that is, air ducts 18 and 19 over the floor plate.

The floor plate-reinforcing member 10 is formed at its central part with a snugly fitting portion 11 of predetermined length which is curved and molded so as to conform to the shape of the longitudinal section of the tunnel portion 4.

On the center line of the snugly fitting portion 11, a concave groove 12 of small width is provided which is slightly shorter than the full length of the snugly fitting portion 11.

Integrally with both side edges 13 and 14 of the snugly fitting portion 11, mounting portions 16 and 17 for an inside seat track are bent and formed. The mounting portions 16 and 17 have a predetermined dimension of width so as to become equal in height to the mounting portions 2 and 3 for the outside seat track at both the side parts of the floor plate 1. As shown by chain lines in FIG. 2, the seats (S) are respectively secured in a manner to extend over the mounting portions 16 and 2 and over the mounting portions 17 and 3.

The front end parts of both the mounting portions 16 and 17 are united, to define a single space of a closed section between them and the floor plate.

The front end of the above space is made an opening portion 15 which is connected to an air blow-out port (B) of an air conditioner (A). From a position slightly behind the opening portion 15, the mounting portions 16 and 17 are branched in the same shape along both the side edges 6 and 7 of the tunnel portion 4.

At the rear end parts of the air ducts 18 and 19 being the spaces of a closed section defined between the mounting portions 16, 17 and the floor plate 1, there are provided air blow-out ports 20 and 21 which are opened towards the feet of rear seat occupants.

At a lower part of the rear end of the snugly fitting portion 11 and at peripheral edge parts of the lower ends of both the mounting portions 16 and 17, a mounting piece 22 is bent and formed which serves to secure and dispose the floor plate-reinforcing member 10 onto the floor plate 1 and the tunnel portion 4.

At predetermined positions of the air ducts 18 and 19 in the mounting portions 16 and 17, reinforcement plates 23 and 24 are integrally disposed. Holes 25 and 26 for mounting the seat track are provided in the reinforcement plates 23 and 24 in a manner to pierce the mounting portions 16 and 17. On the back surfaces of the reinforcement plates 23 and 24 at the holes 25 and 26, weld nuts 27 and 28 are welded. The seat track is clamped with bolts on the respective nuts 27 and 28. In FIG. 1, marks ($x$) at various parts of the floor plate-reinforcing member 10 indicate places which are integrally welded to the floor plate 1 and the tunnel portion 4.

Although, in the embodiment, the case where the tunnel portion 4 is formed over the floor plate 1 has been described, the invention can of course be applied to car types which do not have the tunnel portion over the floor plate.

According to the floor structure of a car body of the present invention as has the foregoing construction, the floor plate-reinforcing member 10 is fixed and arranged over a predetermined length on the floor plate 1 and the tunnel portion 4, and hence, even when a high load in the direction of an arrow (R) in FIG. 1 is transmitted to the seat track a seat belt, the impact high load is dispersed to various parts in an averaged manner without being concentrated on a specific position.

Thus, the safety can be enhanced by preventing the deformation of the floor plate, the forward falling of the seat or the infliction of a severe damage on an occupant as in the floor structure of the prior art.

In addition, since the floor plate-reinforcing member 10 is formed into the shape of a closed section, the strength and rigidity of the floor plate 1 are increased. Furthermore, since the inner parts of the mounting portions 16 and 17 function as the air ducts 18 and 19, separate air ducts and separate bodies of brackets for mounting the seat track as in the prior art are not necessary at all.

What is claimed is:

1. In an automobile having individually mounted seats and a drive shaft for transmitting power to wheels thereof, a floor construction for an automobile body, said floor construction comprising:

a floor plate comprising, substantially along the centerline thereof, a substantially longitudinally extending substantially inverted U-shape tunnel portion adapted to partially surround the drive shaft, and a plate portion extending transversely from each lower edge of each side of the tunnel portion in a direction from the other side thereof, a substantially longitudinally extending reinforcing member mounted over the tunnel portion, said reinforcing member being connected to each plate portion and comprising attaching portions on each side threof adapted to have an inner seat track of a respective seat connected thereto, said reinforcing member, a longitudinally extending portion of each side of the tunnel portion, and a longitudinally extending portion of the respective plate portion extending from that side defining a respective substantially longitudinally extending air duct therebetween, an opening at one end of said ducts fluidly connected to the outlet of an air conditioner, and an air outlet at the other end of each of said ducts.

2. The floor construction for an automobile body as claimed in claim 1, wherein:

an upper longitudinally extending portion of said reinforcing member is of a size and shape substantially identical to that of the upper portion of the U-shaped tunnel portion and is positioned thereon, said reinforcing member comprising a longitudinally extending flange extending transversely from each lower edge of each side of said reinforcing member, and securing means connecting each flange on each side directly to the plate portion on that side.

3. The floor construction for an automobile body as claimed in claim 1, wherein:

the attaching portions converge together at said one end and define said opening, and the height, above the respective plate portion, of the portion of each of said attaching portions to which an inner seat track is adapted to be connected is substantially identical to the height, above the respective plate portion, of an outer seat track attaching portion on the respective side which is adapted to have an outer seat track of a respective seat connected thereto.

4. In an automobile having individually mounted seats and a drive shaft for transmitting power to wheels thereof, a floor construction for an automobile body, said floor construction comprising:

a floor plate comprising, substantially along the centerline thereof, a substantially longitudinally extending inverted U-shaped tunnel portion adapted to partially surround a drive shaft, and a plate portion extending transversely from each lower edge of each side of the tunnel portion in a direction away from the other side thereof, 5. The floor construction for an automobile body as claimed in claim 4, wherein:

said ducts coverge at one end and have an opening fluidly connected to a source of air, and and air outlet at the other end of each of said ducts.

6. The floor construction for an automobile body as claimed in claim 4, wherein:

said reinforcing member further comprises a reinforcement plate integrally connected to each mounting portion adjacent points of attachment thereof of an inner seat track of a respective seat.

7. The floor construction for an automobile body as claimed in claim 4, wherein:

said reinforcing member further comprises a horizontally extending flange portion extending transversely outwardly from the lower edge of each second wall portion, and securing means connecting each flange portion on each side directly to the plate portion on that side.

* * * * *